US009016002B2

(12) United States Patent  (10) Patent No.: US 9,016,002 B2
Segall  (45) Date of Patent: Apr. 28, 2015

(54) RELOCATABLE HABITAT UNIT HAVING INTERCHANGEABLE PANELS

(71) Applicant: Stuart Charles Segall, La Jolla, CA (US)

(72) Inventor: Stuart Charles Segall, La Jolla, CA (US)

( * ) Notice: Subject to any disclaimer, the term of this patent is extended or adjusted under 35 U.S.C. 154(b) by 0 days.

(21) Appl. No.: 13/843,707

(22) Filed: Mar. 15, 2013

(65) Prior Publication Data

US 2014/0123572 A1    May 8, 2014

Related U.S. Application Data

(63) Continuation-in-part of application No. 12/043,759, filed on Mar. 6, 2008, now Pat. No. 8,677,698.

(51) Int. Cl.
| | |
|---|---|
| *E04B 1/348* | (2006.01) |
| *E04B 1/343* | (2006.01) |
| *E04H 1/12* | (2006.01) |
| *G09B 9/00* | (2006.01) |
| *E04B 1/61* | (2006.01) |

(52) U.S. Cl.
CPC .......... *E04H 1/1205* (2013.01); *E04B 1/34315* (2013.01); *E04B 1/6183* (2013.01); *G09B 9/003* (2013.01)

(58) Field of Classification Search
CPC ............ E04B 1/34861; E04B 1/34315; E04B 1/34321; E04B 1/34384; E04B 1/1903; E04B 1/6183; E04H 1/1205; G09B 9/003
USPC .................. 52/36.2, 79.5, 79.9, 79.12, 79.13, 52/127.6, 127.7, 127.8, 127.9, 127.11, 52/281, 282.1–282.4, 284, 285.1, 285.4, 52/582.2; 446/108, 111, 112, 122
See application file for complete search history.

(56) References Cited

U.S. PATENT DOCUMENTS

| | | | | |
|---|---|---|---|---|
| 42,994 | A * | 5/1864 | Sellers | ............................... 70/81 |
| 182,141 | A | 9/1876 | Wilson | |
| 419,920 | A * | 1/1890 | Campbell | ................... 217/12 R |
| 797,768 | A * | 8/1905 | Fisher | .......................... 292/204 |
| 1,149,488 | A | 8/1915 | Arndt | |
| 1,276,932 | A | 8/1918 | King | |
| 2,019,692 | A * | 11/1935 | Mueller | ..................... 160/229.1 |
| 2,168,725 | A * | 8/1939 | Whelan | ........................ 52/220.2 |
| 2,581,816 | A * | 1/1952 | Schlueter | ..................... 52/582.2 |
| 2,647,287 | A * | 8/1953 | Jones | ............................ 52/582.2 |
| 2,793,401 | A * | 5/1957 | Paschke | .......................... 52/264 |
| 2,900,678 | A * | 8/1959 | Curtis | ........................... 52/127.8 |
| 2,952,799 | A * | 9/1960 | Wortman et al. | ............. 361/605 |

(Continued)

FOREIGN PATENT DOCUMENTS

CH          445075 A  * 10/1967
WO   WO 2006001824 A1 *  1/2006

*Primary Examiner* — Robert Canfield
*Assistant Examiner* — Charissa Ahmad
(74) *Attorney, Agent, or Firm* — Gary L. Eastman, Esq.

(57) ABSTRACT

A construction set and method for assembling a single-, or multi-level Relocatable Habitat Unit (RHU) requiring a plurality of flat panels that include male (M) and female (F) lock connectors located on their respective peripheries and a frame constructed from a plurality vertical corner posts and horizontal beams. The entire RHU can be assembled using a single, hand-operated tool to engage a selected M lock with a selected F lock in addition to other securing hardware. First the floor is established and leveled. Next, starting at a corner, the walls are erected around the floor using vertical corner posts and horizontal beams. Finally, the roof is created. The same, hand-operated tool is used for each task.

14 Claims, 9 Drawing Sheets

(56) References Cited

U.S. PATENT DOCUMENTS

| | | | | |
|---|---|---|---|---|
| 3,135,542 | A | * | 6/1964 | Wilkinson ............... 292/204 |
| 3,236,014 | A | | 2/1966 | Edgar |
| 3,280,522 | A | * | 10/1966 | Palfey et al. .............. 52/127.9 |
| 3,281,169 | A | * | 10/1966 | Houvener ................ 52/582.2 |
| 3,298,145 | A | * | 1/1967 | Minervini et al. ......... 52/127.9 |
| 3,372,519 | A | * | 3/1968 | Russell ..................... 52/274 |
| 3,391,512 | A | * | 7/1968 | Lopina ....................... 52/768 |
| 3,392,497 | A | * | 7/1968 | Cushman .................. 52/272 |
| 3,421,459 | A | * | 1/1969 | Sherwood .................. 108/13 |
| 3,461,633 | A | * | 8/1969 | Ziegelman et al. ......... 52/643 |
| 3,469,877 | A | | 9/1969 | Hutchison |
| 3,611,667 | A | | 10/1971 | Maxwell, Sr. |
| 3,645,573 | A | | 2/1972 | Strang |
| 3,665,791 | A | | 5/1972 | Carr |
| 3,729,889 | A | * | 5/1973 | Baruzzini .................. 52/264 |
| 3,758,998 | A | * | 9/1973 | Ollis et al. ................ 52/79.13 |
| 3,771,273 | A | * | 11/1973 | Brodie ....................... 52/646 |
| 3,818,661 | A | * | 6/1974 | Pragg, III ................. 52/282.4 |
| 3,832,811 | A | * | 9/1974 | Briel, Jr. ...................... 52/69 |
| 3,913,292 | A | * | 10/1975 | Braekkan ................. 52/406.1 |
| 4,058,909 | A | * | 11/1977 | Poleri ......................... 434/72 |
| 4,102,097 | A | * | 7/1978 | Zalotay ..................... 52/167.4 |
| 4,158,338 | A | * | 6/1979 | Dippold et al. ............. 109/79 |
| 4,160,610 | A | | 7/1979 | Austin-Brown et al. |
| 4,308,770 | A | * | 1/1982 | MacDonald ............... 81/177.2 |
| 4,315,391 | A | | 2/1982 | Piazza |
| 4,364,206 | A | * | 12/1982 | Wybauw ..................... 52/79.7 |
| 4,439,971 | A | * | 4/1984 | Rutherford .................. 312/263 |
| 4,549,831 | A | * | 10/1985 | Lautenschlager, Jr. ....... 403/231 |
| D283,783 | S | | 5/1986 | Park ........................... D8/59 |
| 4,611,841 | A | * | 9/1986 | Ravinet ..................... 292/241 |
| 4,782,972 | A | * | 11/1988 | Wenkman et al. ......... 220/4.28 |
| 4,813,726 | A | * | 3/1989 | Ravinet ..................... 292/241 |
| 4,910,932 | A | * | 3/1990 | Honigman ................. 52/280 |
| 5,038,535 | A | * | 8/1991 | Van Praag, III ............ 52/127.9 |
| 5,386,788 | A | * | 2/1995 | Linker et al. ................ 109/58 |
| 5,425,520 | A | * | 6/1995 | Masumoto .................. 248/247 |
| 5,619,826 | A | * | 4/1997 | Wu ............................ 52/35 |
| 5,647,181 | A | * | 7/1997 | Hunts ........................ 52/282.1 |
| 5,688,003 | A | * | 11/1997 | Beale ......................... 292/202 |
| 5,741,032 | A | * | 4/1998 | Chaput ...................... 292/202 |
| 5,768,845 | A | * | 6/1998 | Beaulieu et al. ........... 52/585.1 |
| 5,788,395 | A | | 8/1998 | Grieser et al. |
| 5,960,592 | A | * | 10/1999 | Lilienthal et al. ........... 52/79.1 |
| 6,178,701 | B1 | * | 1/2001 | De Paepe et al. ........... 52/36.2 |
| 6,523,868 | B1 | * | 2/2003 | Timothy ..................... 292/241 |
| 6,530,630 | B2 | * | 3/2003 | Herbeck et al. ........... 312/265.4 |
| 6,568,723 | B2 | * | 5/2003 | Murphy et al. ............. 292/241 |
| 6,609,338 | B2 | * | 8/2003 | Hightower ............... 52/204.65 |
| 6,626,017 | B2 | * | 9/2003 | Herbeck et al. ............... 70/63 |
| 6,658,904 | B2 | * | 12/2003 | Herbeck et al. ............... 70/63 |
| 6,662,508 | B1 | * | 12/2003 | Else ........................... 52/177 |
| 6,676,234 | B2 | * | 1/2004 | Herbeck et al. ........... 312/265.4 |
| 6,786,009 | B1 | * | 9/2004 | McGunn et al. ............ 52/36.2 |
| 6,892,498 | B1 | * | 5/2005 | Roman ....................... 52/79.5 |
| 7,150,208 | B2 | * | 12/2006 | Debley ........................ 81/59.1 |
| 7,334,377 | B2 | * | 2/2008 | Dubensky et al. ............. 52/780 |
| 7,665,775 | B1 | | 2/2010 | Miller et al. |
| 7,716,895 | B2 | * | 5/2010 | Fairorth et al. ............. 52/582.2 |
| 7,922,223 | B2 | * | 4/2011 | Lawrence ................... 292/241 |
| 7,954,294 | B2 | | 6/2011 | Appleford |
| 2002/0095888 | A1 | * | 7/2002 | Winskye ..................... 52/234 |
| 2006/0277852 | A1 | * | 12/2006 | Mower et al. ............... 52/270 |
| 2007/0044411 | A1 | | 3/2007 | Meredith et al. |
| 2007/0175115 | A1 | * | 8/2007 | Price ......................... 52/169.12 |
| 2008/0282623 | A1 | * | 11/2008 | Powell ......................... 52/71 |
| 2009/0107056 | A1 | * | 4/2009 | Kirilichin et al. ............ 52/79.1 |
| 2009/0165401 | A1 | * | 7/2009 | Smalley, III ................. 52/91.3 |
| 2010/0018131 | A1 | * | 1/2010 | Green ........................ 52/79.5 |

\* cited by examiner

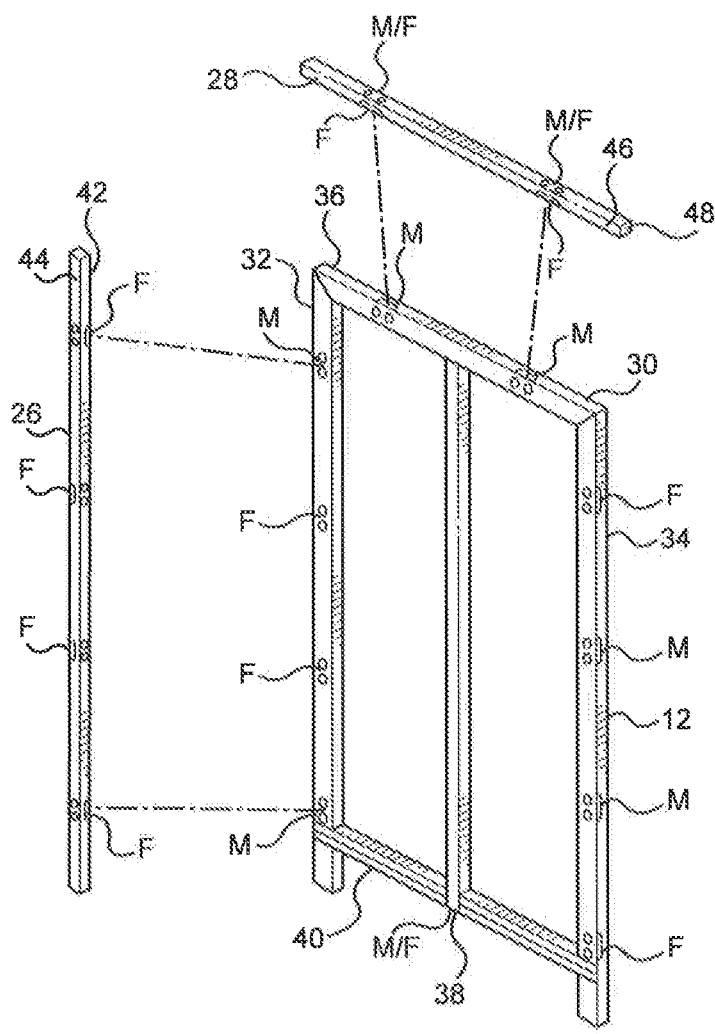
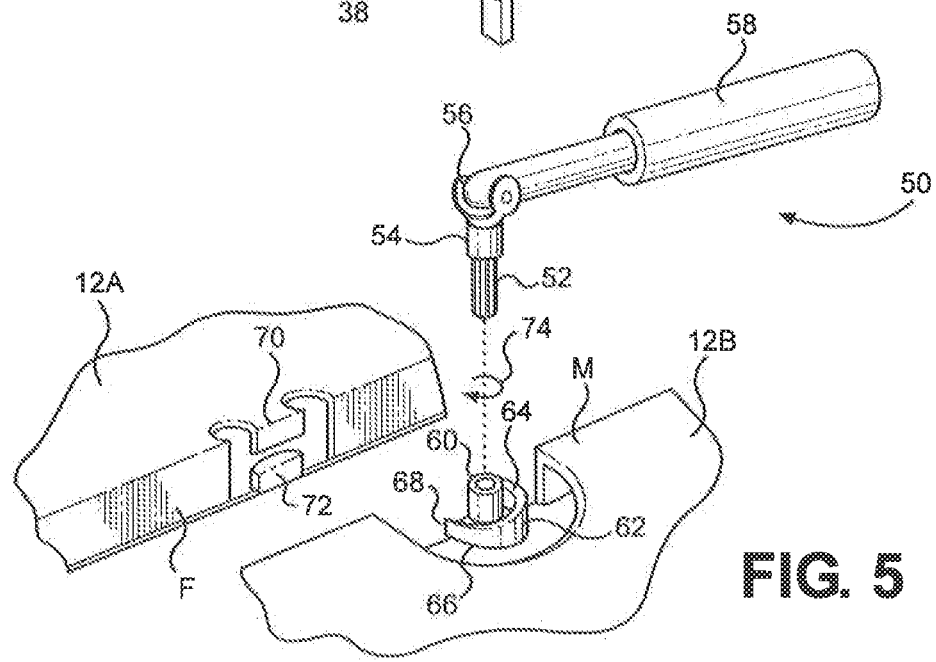
FIG. 4
FIG. 5

RELOCATABLE HABITAT UNIT HAVING INTERCHANGEABLE PANELS

RELATED APPLICATIONS

This application is a Continuation in Part of, and claims the benefit of priority to the United States Provisional Patent Application for "Relocatable Habitat Unit," Ser. No. 12/043,759, filed on Mar. 6, 2008, and currently issued as U.S. Pat. No. 8,677,698.

FIELD OF THE INVENTION

The present invention pertains generally to Relocatable Habitat Units (RHUs) for use in simulating an environment for a military combat training scenario. More particularly, the present invention pertains to an RHU that can be assembled and disassembled on-site, using panels that can be maneuvered, positioned and interconnected by no more than two men. The Present invention is particularly, but not exclusively, useful as a system and method for the complete assembly of an RHU using only a single hand-operated tool.

BACKGROUND OF THE INVENTION

Military training must necessarily be conducted in an environment that will simulate anticipated combat operations as accurately as possible. For a comprehensive training program, this requires the ability and flexibility to relocate and set-up several different types of training environments. In general, training sites may need to selectively simulate either an urban, suburban or an open terrain environment.

For a training site, the realism that can be attained when simulating a particular environment can be clearly enhanced by introducing indigenous persons (i.e. actors) into the training scenario. Further, in addition to the indigenous persons, urban and suburban environments can be made even more realistic when trainees are confronted by obstacles, such as buildings (e.g. habitats). In most instances, such structures can be relatively modest. Nevertheless, their integration into the training scenario requires planning.

Providing realistic buildings for a training environment requires the collective consideration of several factors. For one, the buildings need to present a visual perception that is accurate for the particular training scenario. Stated differently, they need to "look the part." For another, it is desirable that structures assembled on the training site be capable of disassembly for relocation to another training site and subsequent use. Such use of state-of-the-art movie industry special effects, role players, proprietary techniques, training scenarios, facilities, mobile structures, sets, props, and equipment all contribute to the Hyper-Realistic™ training model and serve to increase the quality of training.

For military mountain locations such as the Marine Corps Mountain Warfare Center, near Bridgeport, Calif., the 8,000 foot elevation is accessible only by four-wheel drive vehicles, while some mountains such as those in Fort Irwin, Calif., are accessible only by helicopter. Additionally, due to regulations, the nature of the military compound, and the environment, only non-permanent structures may be placed on the Marine Corps Mountain Warfare Center. With this last point in mind, the ability to easily assemble and disassemble a budding used as a training aide is a key consideration.

Heretofore, military combat training scenarios have been conducted either on open terrain, or at locations where there have been pre-existing buildings or other structures. The alternative has been to bring prefabricated components of buildings to a training site, and then assemble the components to create the building. Typically, this has required special equipment and considerable man-hours of labor sometimes even requiring the assistance of Military Construction Units (MILCON), requiring significant military financial resources to erect and disassemble such "non-permanent" structures.

In light of the above, it would be advantageous to provide a training environment which can utilize the Hyper-Realistic™ combat environment at any on-site location in a variety of complex, tactically challenging configurations. It would be further advantageous to provide a training environment where the structures are field-repairable allowing realistic visual feedback to trainees during live fire field exercise, while still allowing multiple training runs without the need to replace training structures. It is an object of the present invention to provide a repairable construction set and method for assembling and disassembling an RHU in a variety of configurations, at a training site, with as few as two persons. Alternatively, it is an object of the present invention to provide a repairable non-permanent construction set having the ability of off-site assembly for air transport to facilitate training in remote locations or at high altitudes for specialized military training without the need for military construction units (MILCON). Still another object of the present invention is to provide a construction set that requires the use of only a single, hand operated tool for the assembly and disassembly of an entire RHU. Yet another object of the present invention is to provide a construction set for the assembly and disassembly of an entire RHU that is relatively simple to manufacture, is extremely simple to use, and is comparatively cost effective.

SUMMARY OF THE INVENTION

A Relocatable Habitat Unit (RHU) in accordance with the present invention is assembled using a plurality of substantially flat panels, designed to be modular, scalable, reconfigurable, and relocatable.

The RHU is based on a lightweight 4'×8' composite material panel system and engineered to assemble into multi-story, complex configurations with a single tool. The RHU panels are constructed with pultruded fiberglass reinforced plastic beams, bonded with wood, composite, or expanded polystyrene foam panels that are laser cut to replicate the look and texture of various building materials like brick, adobe, mud, wood, bamboo, straw, thatch, etc., sprayed with one-eighth inch of a fire retardant pro-bond and "sceniced" (a movie industry term that means "aged," to look weathered). Materials and construction provide all-weather, long-lasting, fire-retardant structures suitable for year-round military training in all environments. In a preferred embodiment, any interior or exterior panel can be interchanged. Common amenities such as windows, doors, stairs, etc. can be attached or installed to the RHU structure, Additionally, a variation of these modular panels can also be used to clad other structures, such as containers, wooden temporary structures, or permanent buildings. For this assembly operation, each panel includes male (M) and female (F) lock connectors. Specifically, these connectors are located along the periphery of each panel, and of each component that interfaces with the edge of a panel Importantly, all of the male connectors can be engaged with a respective female connector using the same tool Thus, an entire RHU can be assembled and disassembled in this manner. Further, each panel is sufficiently lightweight to be moved and positioned by one person. As a practical matter, a second person may be required to use the tool and activate the connectors as a panel is being held in place by the other person.

In detail, a construction set for use with the present invention includes a plurality of panels and only the one tool Each panel has a periphery that is defined by a left side edge, a right side edge, a top edge and a bottom edge. Selected panels, however, can have different configurations that include a door or a window. Still others may simply be a solid panel. In particular, solid panels are used for the floor and ceiling (roof) of the RHU. Each panel, however, regardless of its configuration, will include at least one male connector and at least one female connector that are located on its periphery.

In addition to the wall, floor, and ceiling panels, an embodiment of the construction set also includes corner connections and ceiling attachments. Specifically, corner connections are used to engage wall panels to each other at the corners of the RHU. The ceiling attachments, on the other hand, allow engagement of roof panels with the top edges of wall panels and can also be used to stack multiple levels of a RHU creating complex multi-level urban structure designs. In the multi-level configuration, vertical corner posts and horizontal beams provide a similar function to the corner connections and ceiling attachments, and are used to construct a frame to support a plurality of panels, completing an RHU.

The placement and location of male (M) and female (F) lock connectors on various panels of the construction set is important. In an embodiment, along the right side edge of each wall panel, between its top edge and bottom edge, the lock configuration is (FMMF). Along its left side edge, the lock configuration is the complement, or (MFFM). Further, along the top edge the lock configuration is (MM), and along the bottom edge it is (M or F [depending on the connector of the floor panel]). Each lock sequence will have a complementary analogue on the interfacing surface allowing easy interchangeability of the panels.

Unlike the panels, the corner connections are elongated members with two surfaces that are oriented at a right angle to each other. The lock configurations in an embodiment of a corner connection are (F-F) along one surface and (-FF-) along the other surface. Like the corner connections, the ceiling attachments also present two surfaces that are at a right angle to each other. Their purpose, however, is different and accordingly they have a (FF) lock configuration on one surface for engagement with the top edge of a wall panel. They also have either a (MM) or a (FF) configuration along the other surface for connection with a ceiling panel.

Importantly, in addition to the above mentioned panels, connections and attachments, the construction set of the present invention includes a single hand tool. Specifically, this hand tool is used for activating the various male (M) connectors for engagement with a female (F) connector, in addition to driving other required hardware. For the present invention, this tool preferably includes a hex head socket, a drive that holds the hex head socket, and a ratchet handle that is swivel-attached to the drive.

For assembly of the RHU, the first task is to establish a substantially flat floor. This is done by engaging male (M) connectors on a plurality of floor panels with female (F) connectors on other floor panels. The floor is then leveled using extensions that can be attached to the floor panels at each corner. Next, a wall is erected around the floor of the RHU by engaging a male connector on the right side edge of a respective wall panel with a female connector on the left side edge of an adjacent wall panel. Recall, the lock configurations on the left and right edges of wall panels are, respectively, (FMMF) and (MFFM). Additionally, the bottom edge of each panel in the wall is engaged to the floor using mutually compatible male (M) and female (F) connectors. Finally, the roof is created for the RHU by engaging male (M) connectors on ceiling panels with female (F) connectors on other ceiling panels. The ceiling attachments are then engaged to the assembled roof. In turn, the ceiling attachments are engaged to the top edge of a wall panel using mutually compatible male (M) and female (F) connectors. All connections for the assembly of the RHU are thus accomplished using the same tool.

In a preferred embodiment all panels are interchangeable. A frame is constructed consisting of vertical corner posts and horizontal beams (analogous to the corner connections and ceiling attachments), each formed with M and F lock connectors along their length that complement the lock connectors on the periphery of the panels. Once the frame is in place, the panels may be configured and reconfigured as needed. Vertical corner posts and horizontal beams are also secured together using the single tool and additional hardware. By assembling a plurality of RHUs in this manner, the RHUs can be configured in nearly any complex configuration that will best simulate the indigenous environment desired. A plurality of RHUs can be placed side-to-side, back-to-back, offset, stacked, or staggered to create a multi-level scalable structure. A simple repair kit provides quick easy patching of the composite materials.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 4 is a perspective view of a single wall panel of an RHU positioned for engagement with a corner section and a ceiling attachment;

FIG. 5 is a perspective view of portions of two panels from an RHU, with portions broken away to show the interaction of male (M) and female (F) connectors in their operational relationship with a tool that is used to assemble the RHU in accordance with the present invention;

DETAILED DESCRIPTION

Figure 1:
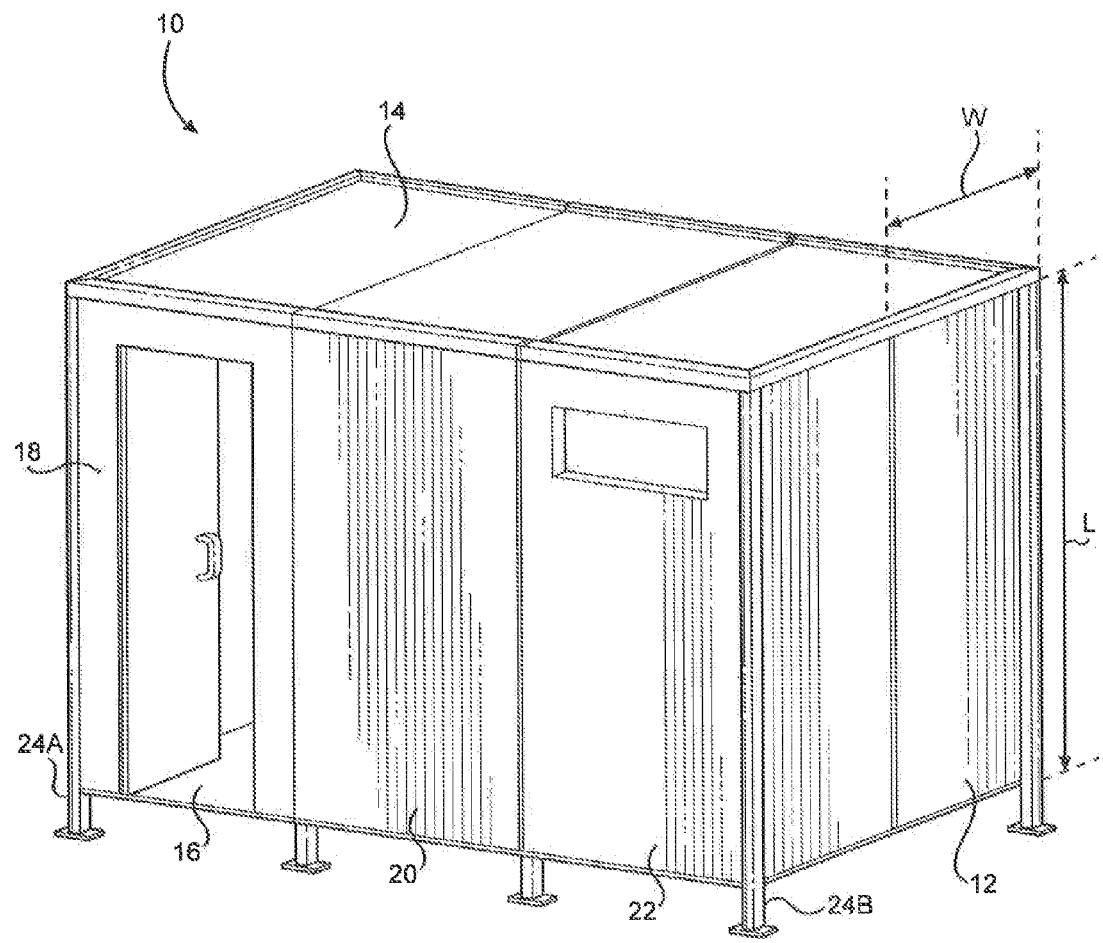
FIG. 1 is a perspective view of an assembled Relocatable Habitat Unit (RHU) in accordance with the present invention.

Referring initially to FIG. 1, a Relocatable Habitat Unit (RHU) in accordance with the present invention is shown and is generally designated 10. As shown, the RHU 10 includes a plurality of individual panels, of which the generic panel 12 (sometimes hereinafter referred to as a wall panel) is exemplary. The panel 12 is substantially flat, and is rectangular in shape with a width ("W") of approximately four feet and a length ("L") of approximately eight feet (i.e. the panel 12 is a 4×8). Alternatively, a panel 12 may be dimensioned as a 4×4. The depth of the panel 12 can vary slightly but, in general, will only be two or three inches. Preferably, the panel 12 is made of a light-weight composite polymer foam type material, such as expanded polystyrene foam panels having a density of approximately two pounds per cubic foot, with pultruded fiberglass reinforced plastic beams framing the foam core.

In an embodiment of the RHU 10 of the present invention there are essentially three types of panels 12. These are generally denoted by their structural function in the RHU 10 and are: a wall panel 12, a ceiling panel 14 and a floor panel 16. Further, the wall panels 12 may have any of three different configurations. Specifically, these configurations are shown in FIG. 1, and are: a door panel 18, a solid panel 20 and a window panel 22. Additional preferred embodiments with interchangeable wall, ceiling, and floors panels are detailed below.

Regardless of configuration, however, the exterior of each wall panel 12 can be dressed to appropriately simulate the desired indigenous environment. In order to replicate diverse geographic conflict zones and facilitate the Hyper-Realistic™ combat training experience, the panels 12 can be laser etched providing the ability to replicate the look and texture of various building materials including brick, cinder block, adobe, mud, wood, bamboo, straw, thatch, or other required looks. FIG. 1 also shows that the RHU 10 is supported by a plurality of adjustable extensions, of which the extensions 24a and 24b are exemplary.

Figure 2:
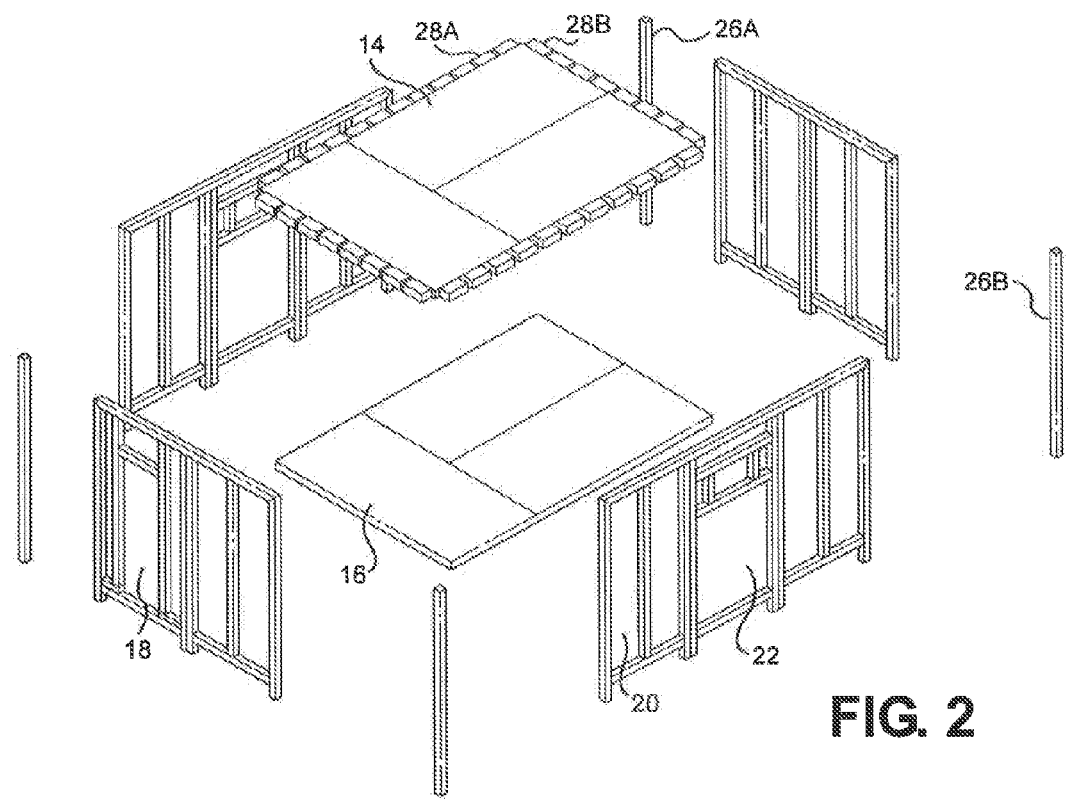
FIG. 2 is an exploded perspective view of an RHU.

FIG. 2 shows that, in addition to the panels 12, the RHU 10 includes a plurality of corner connections 26, of which the corner connections 26a and 26b are exemplary. Further, FIG. 2 shows there is a plurality of ceiling attachments 28, of which the ceiling attachments 28a and 28b are exemplary. As will be more fully appreciated with further disclosure, these corner connections 26 and ceiling attachments 28 are used to interconnect panels 12.

Figure 3:
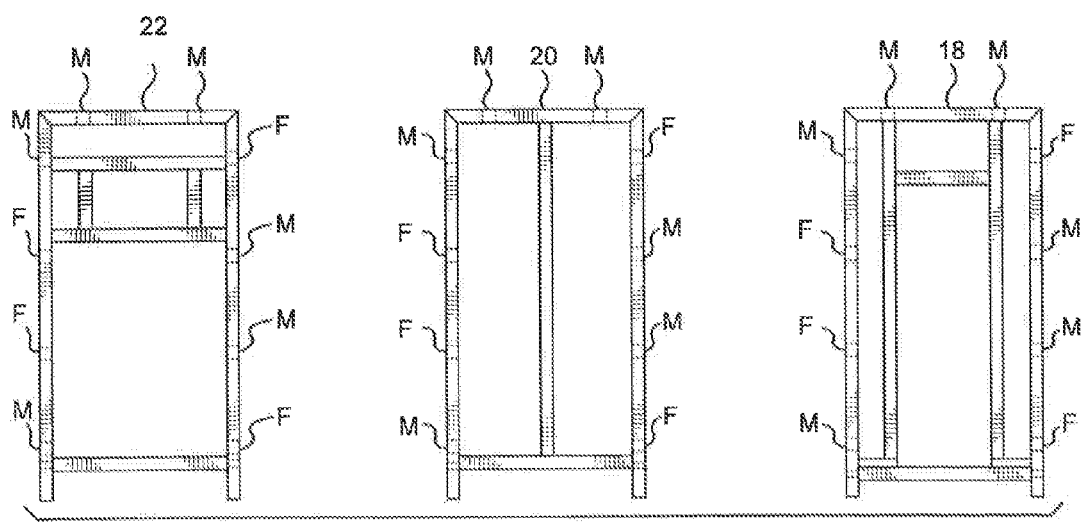
FIG. 3 is an elevation view of three panels for an RHU shown positioned for connection of their respective male (M) and female (F) connectors.

It is an important aspect of the present invention that the panels 12, the corner connections 26 and the ceiling attachments 28 have compatible male 10 (M) and female (F) locking connectors. For example, FIG. 3 shows a door panel 18, a solid panel 20 and a window panel 22 placed in side-by-side relationship with their respective M and F locking connectors positioned for engagement. Details of the structure involved will, perhaps, be best appreciated by cross referencing FIG. 3 with FIG. 4.

In FIG. 4 a panel 12 is shown to have a substantially rectangular periphery 30 that is defined by a left side edge 32, a right side edge 34, a top edge 36 and a bottom edge 38. Further, FIG. 4 shows that the panel 12 includes a ledge 40 that extends along the bottom edge 38 and outwardly from the periphery 30. The purpose of ledge 40 is to rest on a floor panel 16 of an assembled RHU 10 (i.e. when a wall panel 12 has been engaged with the floor panel 16), to thereby provide additional support for the panel 12.

FIG. 4 also shows that a corner connection 26 is an elongated member having a first surface 42 and a second surface 44. For purposes of the present invention, the first surface 42 needs to be oriented at a right angle (i.e. orthogonal) to the second surface 44. Importantly, the first surface 42 is provided with F locking components that are aligned as (F--F). Thus, the first surface 42 of corner connection 26 is compatible with the alignment (MFFM) shown for locking connectors on the left side edge 32 of the panel 12. Stated differently, the top and bottom M lock connectors on the left edge 32 of panel 12 will lock, respectively, with the top and bottom F lock connectors on first surface 42 of corner connection 26. Note also that the alignment of locking connectors on the second surface 44 of corner connection 26 is (-FF-). This is likewise compatible with the alignment (FMMF) that is typical for the right side edge 34 of a panel 12 (see also FIG. 3).

Like the corner connections 26, the ceiling attachments 28 are elongated members. Also, the ceiling attachments 28 have a first surface 465 and a second surface 48. Like the corner connections 26, the first surface 46 of the ceiling attachment 28 needs to be oriented at a right angle (i.e. orthogonal) to its second surface 48. As shown in FIG. 4, the second surface 48 of the ceiling attachment 28 includes a pair of F locking connectors that will interact with respective M locking connectors along the top edge 36 of the panel 12. On the other hand, the first surface 48 may have either M or F locking connectors for engagement with a ceiling panel 14.

The interaction of M and F locking connectors will be best appreciated with reference to FIG. 5. There it will be seen that the present invention employs a tool, generally designated 50. As shown, the tool 50 includes a hex head 52 that is connected to a drive 54. It will be appreciated by the skilled artisan that the hex head 52 shown in FIG. 5, however, is only exemplary of head configurations that may be used for the present invention. In any event, the drive 54 is connected to a swivel ratchet 56 that, in turn, is connected to a handle 58. As envisioned for the present invention, this tool 50 is all that is required to assemble the RHU 10.

Still referring to FIG. 5, it will be seen that the panel portions 12a and 12b have respective F and M locking connectors. As envisioned for the present invention, all M and F locking connectors used for the RHU 10 of the present invention are substantially identical. In detail, the M locking connector is shown to include a hex socket 60 with an attached cam lock 62. Further, the cam lock 62 is shown to have an upper ramp 64 and a lower ramp 66 that are inclined so there is an increasing taper extending from end 68 back to the hex socket 60. In contrast, the F locking connector on panel 12a is shown to include an upper abutment 70 and a lower abutment 72.

For an engagement between an M and an F locking connector, the connectors need to first be juxtaposed with each other. This can be accomplished in any of several ways. For instance, either side edges 32/34 of panels 12 are juxtaposed to each other (e.g. see FIG. 3); ceiling panels 14 and floor panels 16 are respectively juxtaposed (see FIG. 2); a corner connection 26 is juxtaposed with a side edge 32/34 of a panel 12 (e.g. see 5 FIG. 4); a ceiling attachment 28 is juxtaposed with the top edge 36 of a panel 12 or with a ceiling panel 14; or the bottom edge 38 of a panel 12 is juxtaposed with a floor panel 16. In each case, it is important that an M locking connector be positioned opposite an F locking connector.

Once an M and an F locking connector have been properly positioned with each other, as indicated above, the hex head 52 of tool 50 is inserted into the hex socket 60. The tool 50 is then turned in the direction of arrow 74. This causes the ramps 64/66 of cam lock 62 to respectively go behind the abutments 70/72. The M and F locking connectors are then engaged.

In accordance with the present invention, assembly of this embodiment of the RHU 10 is best accomplished by following a predetermined sequence of steps. First, a plurality of floor panels 16 is engaged together to form a floor for the RHU 10. The floor is then positioned and leveled by adjusting the extensions 24 that are provided for that purpose. Next, starting at a corner for the RHU 10, a corner connection 26 is engaged with panels 12. Note: at this point the respective ledges 40 on panels 12 are positioned to rest on the adjacent floor panel 16. Also, the bottom edges 38 of the wall panels 12 are engaged through M/F locking connections to the adjacent floor panel 16. This continues until all walls of the RHU 10 have been erected. As intended for the present invention, door panels 18, solid panels 20 and window panels 22 can 25 be used as desired in the assembly of the walls for the RHU 10.

After the walls of RHU 10 have been erected, the roof is created. Specifically, ceiling attachments 28 are engaged, as required, with a single ceiling panel 14 (see FIG. 2). This ceiling panel 14, with its ceiling attachments 28, is positioned so the ceiling attachments 28 can be 30 connected, via M/F locking connectors, to the top edges 36 of respective panels 12. Additional ceiling panels 14 and their associated ceiling attachments 28 can then be similarly created, positioned and connected to other ceiling panels 14 and other wall panels 12, to complete the roof. The RHU 10 is thus assembled, and appropriate set dressing can then be added.

Importantly, all of the tasks described above for the assembly of an RHU 10 are accomplished using only the tool 50. Axiomatically, it follows that this embodiment of the entire RHU 10 is held together with only a plurality of M/F locking connections.

Figure 6:
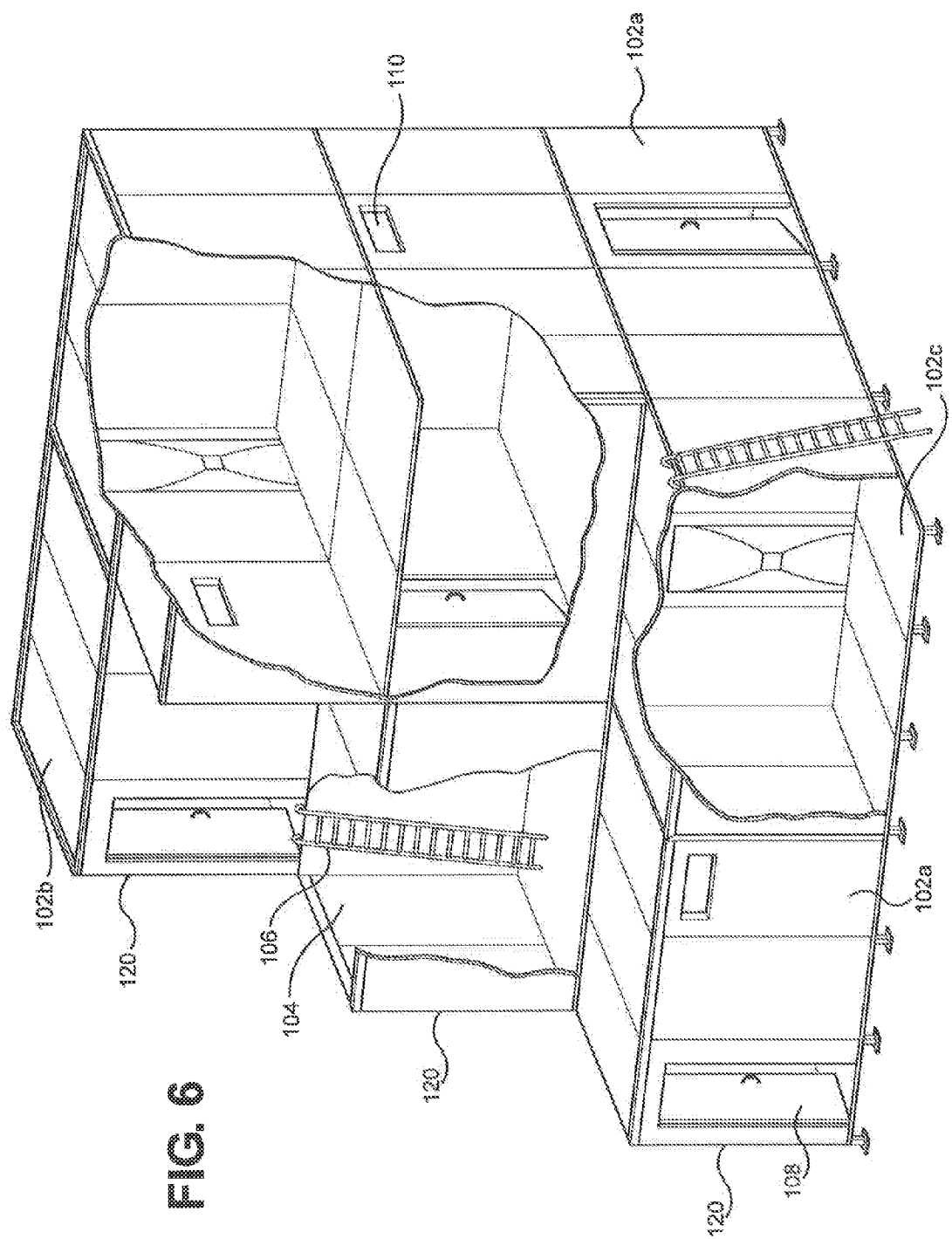
FIG. 6 is a front perspective cut away view of a multi-level RHU having doors and windows formed several of the panels and certain panels omitted leaving a void, allowing access between levels.

Referring now to FIG. 6, a preferred embodiment of the present invention is shown configured in a multi-level arrangement, generally designated 100. Due to the wide array of options, a multi-level RHU 100 has a nearly infinite array of floor plans, completed by using the wide array of building options for multi-level construction or by abutting multiple single-level RHUs 120. RHU 120 is described in further detail with regard to FIG. 7. In order to facilitate construction of RHU 100, an interchangeable panel 102 is incorporated for use as a floor, ceiling, or wall panel. For purposes of this description, panels will be annotated with a letter a, b, or c to denote their use as a wall, ceiling, or floor panel 102. Accordingly, the multi-level RHU 100 of FIG. 6 shows three single-level RHUs 120 formed by joining multiple wall panels 102a, ceiling panels 102b, and floor panels 102c, Nearly any practical single or multi-story floor plan and can be achieved, taking into account the load bearing capabilities of the various members and the need for additional support on the lower floors, as the structure grows beyond the design yield of the various components. As such, the three exemplary stories should not be considered limiting to one skilled in the art.

As shown in FIG. 6, using a plurality of single story base RHUs 120, a multi-story RHU 100 with hundreds of panels is easily assembled. Multi-story RHU 100 has three scalable levels with multiple entry and exit points. Similar to previous embodiments, each of the panels 102 can be formed with a door 108 or a window 110. The size and location of doors 108 and windows 110 may vary based upon design and need. An alternative embodiment of a single level RHU 120 can further be reconfigured to have two or more wall panels 102a absent or removed from the construction and outfitted with roll up doors (not shown in this Figure), similar to a garage door, further facilitating a Hyper-Realistic™ training environment. Each panel 102 is intended to be fully reconfigurable, allowing the replacement of a wall panel 102a with a different wall panel 102a that is formed with a door 108 or window 110, or other amenity without disassembling any other part of the RHU 100. The same is true for each floor panel 102c and ceiling panel 102b. Each panel 102 is designed to be "plug-and-play."

Each single-level RHU 120 is based on an exemplary four foot by eight foot composite material panel 102 system (described in greater detail below) that is lightweight and engineered to assemble into multi-story, complex configurations with only the tool 50.

In order to replicate diverse geographic conflict zones and facilitate the Hyper-Realistic™ combat training experience, the panels 102 can be laser etched and colored appropriately providing the ability to replicate the look and texture of various building materials including brick, cinder block, adobe, mud, wood, bamboo, straw, thatch, or other required looks.

Because the RHU 100 of the present invention is utilized for military training sometimes involving high explosive, incendiary, or live ammunition, a commercially available fire retardant can applied to each panel. In an embodiment, a ⅛ inch fire retardant hard coat is sprayed on each panel 102 mitigating the risk of conflagration while still providing the Hyper-Realistic™ training experience. With such an addition, the RHU 100 (and RHU 120) is Class 1 (Class A) Fire Rated.

In another preferred embodiment, following application of the fire retardant, a commercially available liquid stucco product can be applied before a panel 102 is "sceniced" (pronounced: see-NICKED) which is a common method in the movie industry to create an "aged" weathered look and is well known among those with ordinary skill in the art of stage production and design. The design and configuration of the RHU of the present invention are based on knowledge of military tactic techniques and procedures, security and stability operation, Basic Urban Skills Training ("BUST"), and Close Quarters Bathe ("CQB") principles to replicate structures environment, and signage from virtually any geographic region of the world including but not limited to Iraq, Afghanistan, Southeast Asia, and Africa.

While this method of utilizing tactical military knowledge combined with movie industry techniques for creating a realistic look (HyperRealistic™) for the RHU 100 of the present invention is currently employed, other methods of design, configuration, and aging such a structure for alternative purposes may be used without departing from the scope and spirit of the present invention and have been fully contemplated herein.

To facilitate movement from one level of the mufti-story RHU 100 to the next level, a ceiling panel 102b is left unassembled creating a ceiling void 104. Void 104 can be used in conjunction with a ladder 106 or staircase (not shown) to facilitate the movement between vertical levels. Alternatively, a specialized panel 102 with a stairwell opening can be implemented and used either with a ladder or with a separate staircase attachment (not shown). Virtually any desired design can be created by using additional components for larger multilevel RHUs 100.

Figure 7:
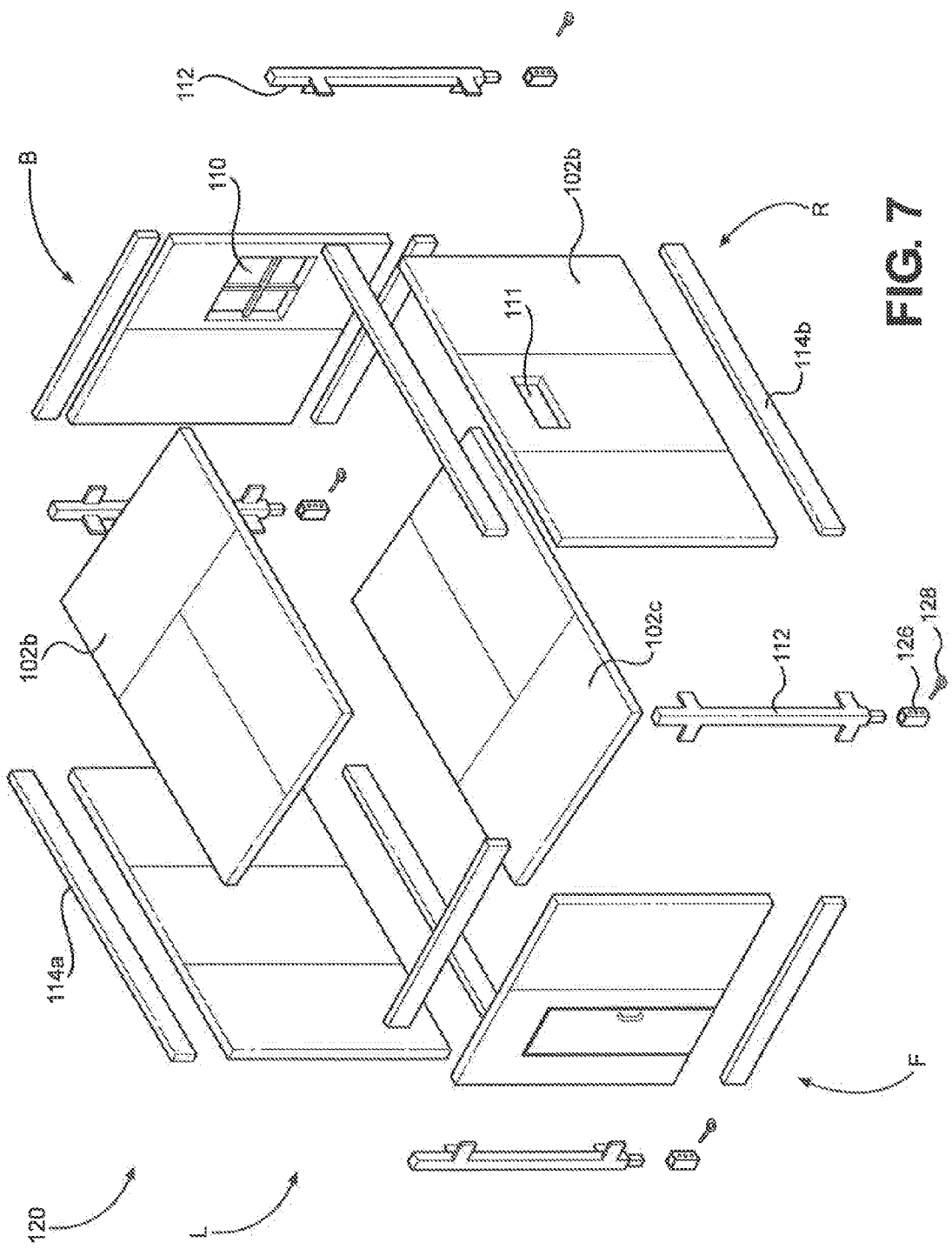
FIG. 7 is an exploded view of a single level relocatable habitat unit showing the interaction of the various interchangeable panels, the vertical corner posts and horizontal beams that create a frame providing a versatile simulated building.

Referring now to FIG. 7, an exploded view of a single level RHU 120 is shown with all of the associated parts. As depicted, 16 interchangeable panels 102 are shown: 10 wall panels 102a, three ceiling panels 102b, and three floor panels 102c. This construction is similar to the RHU of FIG. 1; however all of the panels 102 are fully interchangeable. Further shown in this Figure are four vertical corner posts 112 joining the four was of RHU 120. Four horizontal beams 114 are shown joining the three ceiling panels 102b (forming the ceiling) to the four walls. Four more horizontal beams 114 are further shown connecting the three floor panels 102c (forming the floor of RHU 120) to the four walls. Just as the panels 102 are interchangeable, the horizontal beams 114 are interchangeable and utilized to connect either the ceiling or the floor to a given wall.

The front of RHU 120, generally designated with the letter "F," is formed with two wall panels 102a, one of which is formed with a door 108. The back of RHU 120, generally designated with the letter "B," is also formed with two wall panels 102a, one of which is formed with a window 110. Each of the left and right walls, generally designated with the letters "L" and "R," respectively, is formed of three wall panels 102a. Additionally, the center wall panel 102a of the right wall R is further formed with a small window 111. The left wall L, is formed with three solid wall panels 102a, any of which could just as easily be removed for use as a ceiling panel 102b or a floor panel 102c.

Similar to the panels 18, 20, and 22 of FIG. 3, each panel 102 is capable of connection to an adjacent panel 102, using a plurality of male lock connectors ("M lock") 122 and female lock connectors ("F lock") 124 disposed along the periphery of panels 102 (shown in FIGS. 3 and 8), and arranged to accept the complementary M locks 122 and F locks 124 of an adjacent panel 102. Accordingly, each connecting surface of panels 102, vertical corner posts 112, and horizontal beams 114 are each formed with at least one M lock 122 and F lock 124, simplifying the connection of the various components of RHU 120. In most cases there is a plurality of each M locks 122 and F locks 124 on the connecting surfaces of each part of the construction set. The arrangement of M locks 122 and F locks 124 are complementary on each adjacent surface, facilitating interchangeability of parts.

M locks 122 and F locks 124 are notionally rotary locking cam locks 62 as explained above, requiring only the single tool 50 for the assembly and disassembly of an RHU 100 or 120. It is to be appreciated by those skilled in the art that other connectors may be used without departing from the scope and spirit of the invention.

Also shown in FIG. 7 are four vertical corner posts 112, each formed with complementary M locks 122 and F locks 124 (not shown), spaced and arranged to accept the complementary M lock 122 and F lock 124 (not shown) of adjoining wall panels 102a. As explained above, the vertical corner posts 112 will typically have two adjacent and orthogonal faces formed with the M locks 122 and F locks 124 to facilitate construction of a corner. However, in an embodiment, a vertical corner post 112 can have three or even all four sides formed with the required lock connectors 122 and 124 depending on the design requirements. The tool 50 is used to actuate the M lock 122 to engage with the F lock 124 and secure the vertical corner post 112 with adjacent wall panels 102a. Vertical corner posts 112 have a similar distribution of lock connectors 122 and 124 and are further described with reference to FIG. 9.

Eight horizontal beams 114 are also shown, joining the three connected floor panels 102c, and the three joined ceiling panels 102b, to each of the front wall F, back wall B, left wall L, and right wall R. Horizontal beams 114 are completely interchangeable and can be used either as ceiling connectors 114a or floor connectors 114b. While ceiling connectors 114a and floor connectors 114b are structurally identical, the "a" and "b" designations are added to differentiate their implementation. Horizontal beams 114 are further described with reference to FIG. 10. In an embodiment, horizontal beams 114a and horizontal beams 114b can be formed with slight design variations to accommodate different load conditions on the ceiling and floors.

Adjustable feet 126 are further shown attached to the vertical corner posts 112. RHU 100 and RHU 120 are generally constructed on flat terrain, however it is not generally practical to expect every tactical training environment to be perfectly flat. The addition of adjustable feet 126 to the base of RHU 120 allow the structure to accommodate small irregularities in the terrain upon which it is constructed. In an embodiment, adjustable feet 126 are formed with internal dimensions sized to receive the bottom of vertical corner post 112. Both the body of adjustable feet 126 and the bottom of vertical corner post 112 are formed with a plurality of holes through which a pin 128 or other hardware may be inserted to appropriately adjust the height of adjustable feet 126. In an alternative embodiment, adjustable feet 126 can be mounted to other locations along the base of an RHU 100 or 120 requiring additional support.

In an embodiment, additional adjustable foot assemblies (not shown) may be required for support of the floor along longer constructions or in designs requiring large floor plans.

Once RHU 120 is constructed, the panels 102 forming the RHU 120 can individually be removed and replaced, for instance, in order to repair a damaged ceiling panel 102b or add a replace a solid wall panel 102a with a wall panel 102a having a door 108, simply by releasing or engaging the associated M locks 122 and F locks 124 around the individual panel's 102 periphery.

It should be further noted by one skilled in the art that as depicted, ceiling panels 102b are configured as the ceiling of RHU 120. However, in a multi-level RHU 100, the same ceiling panel 102b can also become a floor panel 102b on an upper level.

Figure 8:
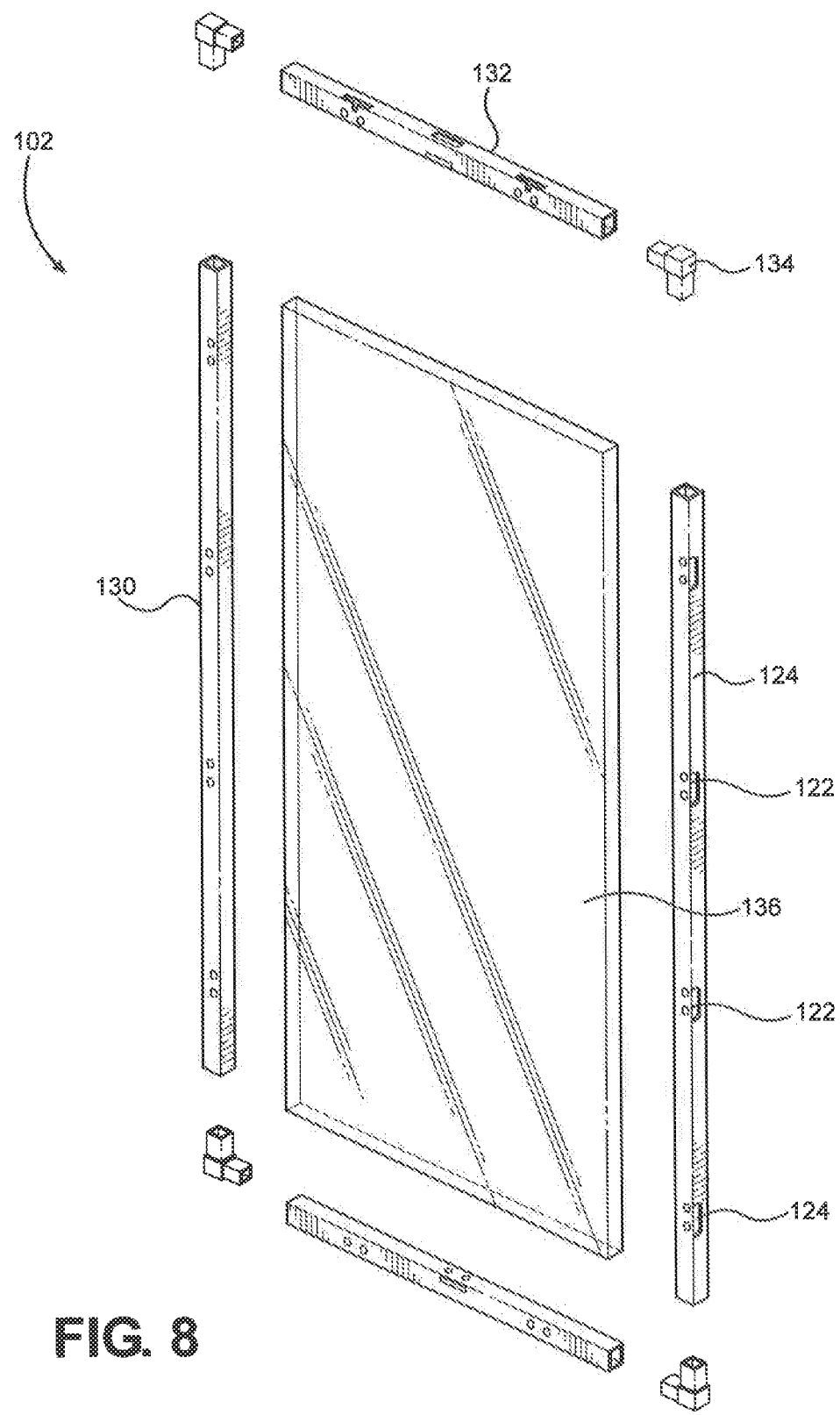
FIG. 8 is an exploded view of the internal structure of an exemplary interchangeable panel of the present invention, showing the interaction of the outer frame parts and inner material.

Referring now to FIG. 8, an exploded view of the internal structure of an exemplary interchangeable panel 102 is shown. Panel 102 as shown is formed with two long beams 130 and two short beams 132, each connected at the corners with corner fittings 134. These eight parts together to form the frame of panel 102. An inner material 136 fills the space between on the interior of the beams 130 and 132. Notionally, inner material 136 is foam, such as expanded polystyrene ("EPS") foam with a weight approximately two pounds per cubic foot. The entire panel 102 is then coated in EPS (not shown), providing an easily scenicd surface, allowing each panel to be customized to suit a particular tactical environment.

The dimensions of panel 102 are generally four feet by eight feet; however the dimensions should not be considered limiting. Such a dimension is common practice, and different sized panels 102 are fully contemplated.

In a preferred embodiment, panel 102 is constructed with beams 130 and 132 formed of pultruded fiberglass reinforced plastic, embedded in an EPS foam type material that serves to further decrease overall weight, compared to a metal construction. In an embodiment, additional composite members (not shown) may be incorporated into the design and composition of the inner material 136 to further increase the load bearing capacity of panels 102. In an alternative embodiment, aluminum or steel components may also incorporated into load bearing members. As such, the corners of the load bearing members may be welded together as is known in the art.

In an alternative preferred embodiment, the inner material 136 is wood or composite impregnated fiber material such as fiberglass. These materials serve to increase the panel's 120 load bearing capability, and are in keeping with the lightweight design of panel 102.

The selection of materials for the construction of panels 102 should not be considered limiting to those skilled in the art, as the essential aspect is a high strength-to-weight ratio. Other suitable materials are fully contemplated. Each panel is intended to be approximately 100 pounds but the ultimate weight can vary with construction materials and structure.

In a preferred embodiment, all three panels, 102a, 102b, and 102c, are identically fabricated and any panel can be used in any position wall, ceiling, or floor, performing one of the three structural functions in the RHU 120. In an alternative embodiment, given real world loads, a floor panel 102c or ceiling panel 102b may include an inner material 136 stronger than EPS by itself. In an alternative embodiment, the beams 130 and 132 can be formed of a metal or metal alloy, creating a stronger frame with an inner material 136 strong enough for application as a load bearing floor panel 102c or ceiling panel 102b.

In a preferred embodiment, when the panels 102 of RHU 100 or 120 are disassembled, panels 102 are stackable and can be palletized in a manner perfectly suited for transport by truck, rail, sea, and air. This is a particularly attractive feature as the RHU 100 of RHU 120 of the present invention is easily deployed to hard-to-reach and remote locations accessible only by a four-wheel drive truck or by helicopter.

Further design of the panels 102 have also taken into account the different load stresses encountered in various environments. While the flame retardant and visual characteristics have been explained above, internally, the panels 102 are strong enough to counter the vertical loading of wall panels 102a and sheer stresses on ceiling panels 102b and floor panels 102c such as a person or items on the roof of an RHU 120, to the sheer stresses from wind or seismic activity acting on the side of a completed RHU 120 or RHU 100.

An embodiment of the present invention further incorporates guy wires utilizing anchors (not shown) driven into the ground or adjacent structures connected to a high point on the RHU 100 or 120, supplementing the sheer strength of the panels and overall construction of the structure.

Figure 9:
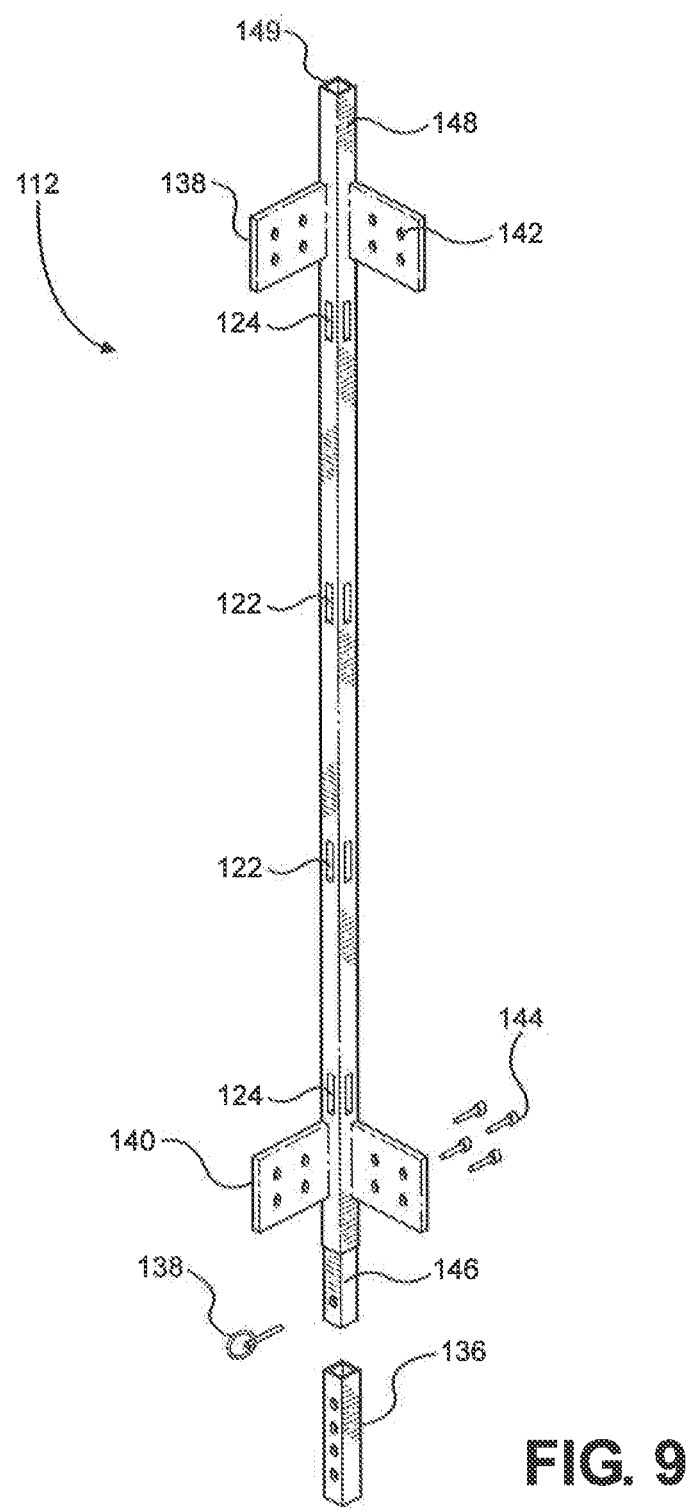
FIG. 9 is a perspective view of a vertical corner post, showing the placement of the flanges for securing horizontal beams, and arrangement of the M locks and F locks along the length of the vertical corner post.

Referring now to FIG. 9, a perspective view of an exemplary vertical corner post 112 is shown. In a preferred embodiment, the vertical corner posts 112 have M locks 122 and F locks 124 spaced along their length in order to accept complementary arrangements on the periphery of panels 102.

Vertical corner posts 112 are notionally formed of steel posts or similar high-strength materials, required due to the high loads encountered, especially when constructing a multi-level RHU 100. Vertical corner posts 112 are formed with flanges 138 and 140 and holes 142 sized to accept hardware 144 to secure horizontal beams 114. Hardware 144 is intended to require the same tool 50 required to actuate the M locks 122 and F locks 124. Using hardware 144, flanges 138 connect to horizontal beams 114a on the ceiling while flanges 140 connect to the horizontal beams 114b on the floor. Together, each creates a frame structure to which panels 102 are subsequently connected.

As shown, adjustable feet 136 are shown disconnected from the vertical corner post 112, with pin 138 extracted. The base 146 of the vertical corner post 112 has dimensions slightly smaller than the adjustable feet 136 as discussed above, allowing vertical movement with the pin 138 extracted. When the desired height of adjustable feet 136 is determined, the holes formed in both the base 146 and vertical corner posts 112 align, allowing insertion of the pin 138 at the desired adjustable foot 136 height.

In an alternative embodiment, vertical corner posts 112 and horizontal beams 114 can be formed in different lengths for different operational or build requirements. In an embodiment, a vertical corner post 112 can be formed more than one story in order to accommodate two floors (shown in FIG. 11). In an alternative preferred embodiment, the top 148 of vertical corner post 112 is formed with a central lumen 149 sized to accept the base 146 of another vertical corner post 112. In such an embodiment, additional pins 138 or other hardware (not shown) can be incorporated to further secure the base 146 of one vertical corner post 112 to the top 148 of the other.

Figure 10:
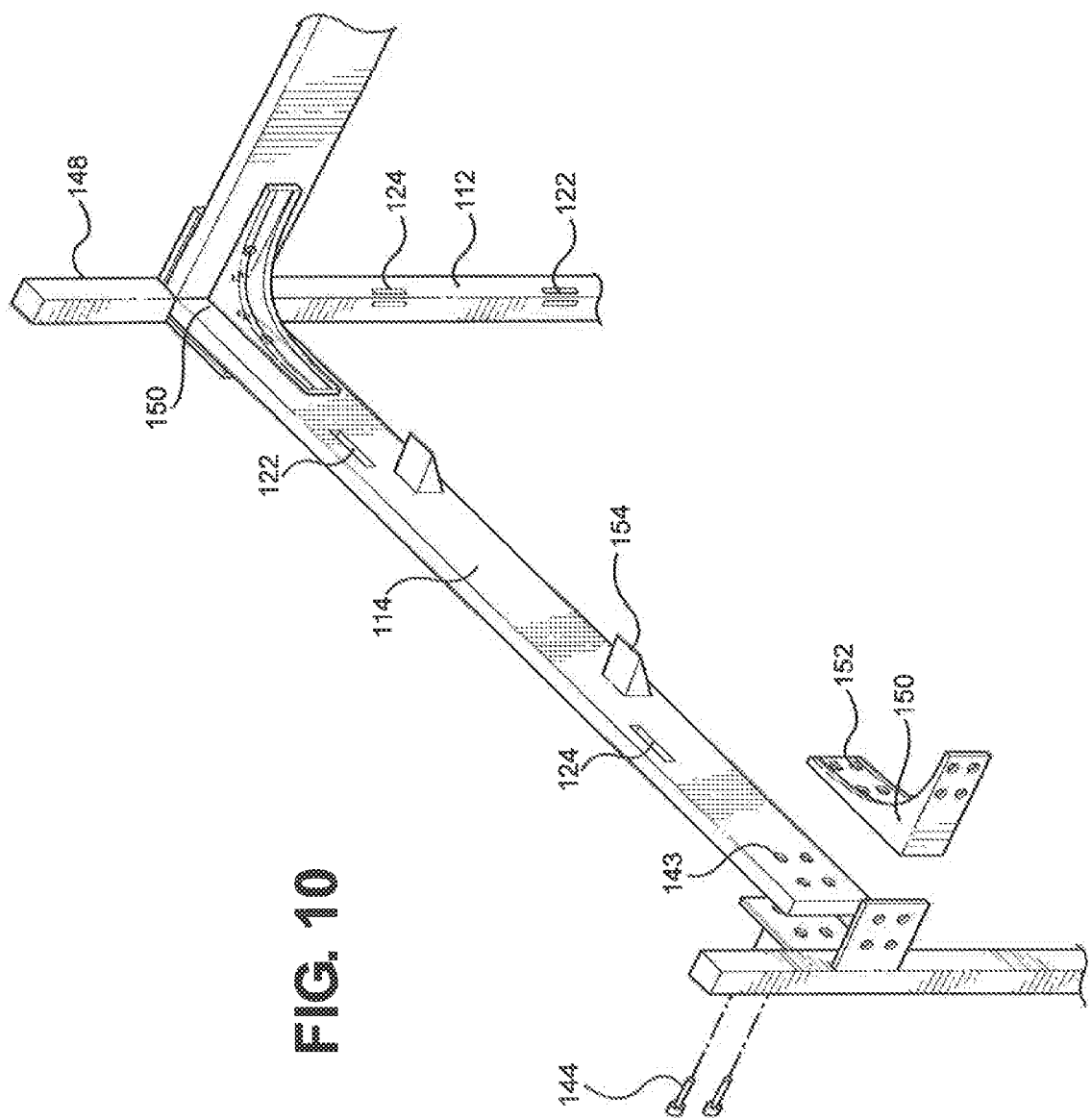
FIG. 10 is a perspective view of two vertical corner posts and their interaction with a horizontal beam, showing the connection points and associated hardware, M locks and F locks formed along the length of the posts and beam for connecting at least one wall panel and at least one ceiling panel, in addition to providing structural support for an upper level.

Referring to FIG. 10, a perspective view of an exemplary horizontal beam 114, as it would be secured to vertical corner posts 112, is shown. In an embodiment, horizontal beams 114 are aluminum beams. Horizontal beams 114 can also be formed of steel however aluminum is generally employed because it is lighter than steel and used in larger components such as horizontal beams 114. It is to be appreciated by those skilled in the art that the material utilized for these components should not be considered limiting. Any suitable material such as aluminum, steel, various alloys, or even composites may be employed to form vertical corner posts 112 and horizontal beams 114.

Horizontal beam 114 is formed with holes 143 to accept the hardware 144. In a preferred embodiment, holes 143 can be internally threaded to match the complementary external threads on hardware 144. In another preferred embodiment, a corner bracket 150 is incorporated on the interior of the horizontal beams 114 providing increased structural support, in an embodiment, the corner brackets 150 have holes 152 that may further be internally threaded to accept the external threads of the hardware 144 in use. The internal threading of either or both holes 143 within horizontal beam 114 or the holes 152 in the corner bracket 150 is not to be considered limiting. Further hardware such as cage nuts or other securing apparatus may be implemented or otherwise formed to the interior of corner bracket 150. However in order to maintain simplicity of the system, it is desirable that a preferred embodiment of the present invention use hardware 144 such as a bolt capable of being driven by tool 50 to secure all of the RHU 100 hardware.

In another preferred embodiment, the horizontal beams 114 are formed with tabs 154 that provide support to the beams 130 and 132 of panels 102 in use as ceiling panels 102b or floor panels 102c. When utilized as a floor panel 102c or ceiling panel 102b, the beams 130 and 132 of panel 102 rest upon and are supported by tabs 154 and optionally, within corner brackets 150. M locks 122 and F locks 124 are also spaced along the periphery of horizontal beams 114 and secure to the complementary M locks 122 and F locks 124 of panels 102 in use.

In an embodiment, the horizontal beams 114 can be formed in any practical length, accommodating one, two, or more panels 102. Accordingly, with four by eight foot panels 102 in use, horizontal beams 114 will notionally be formed in sections of multiples of four feet, and long enough to accommodate the number of required panels.

Figure 11:
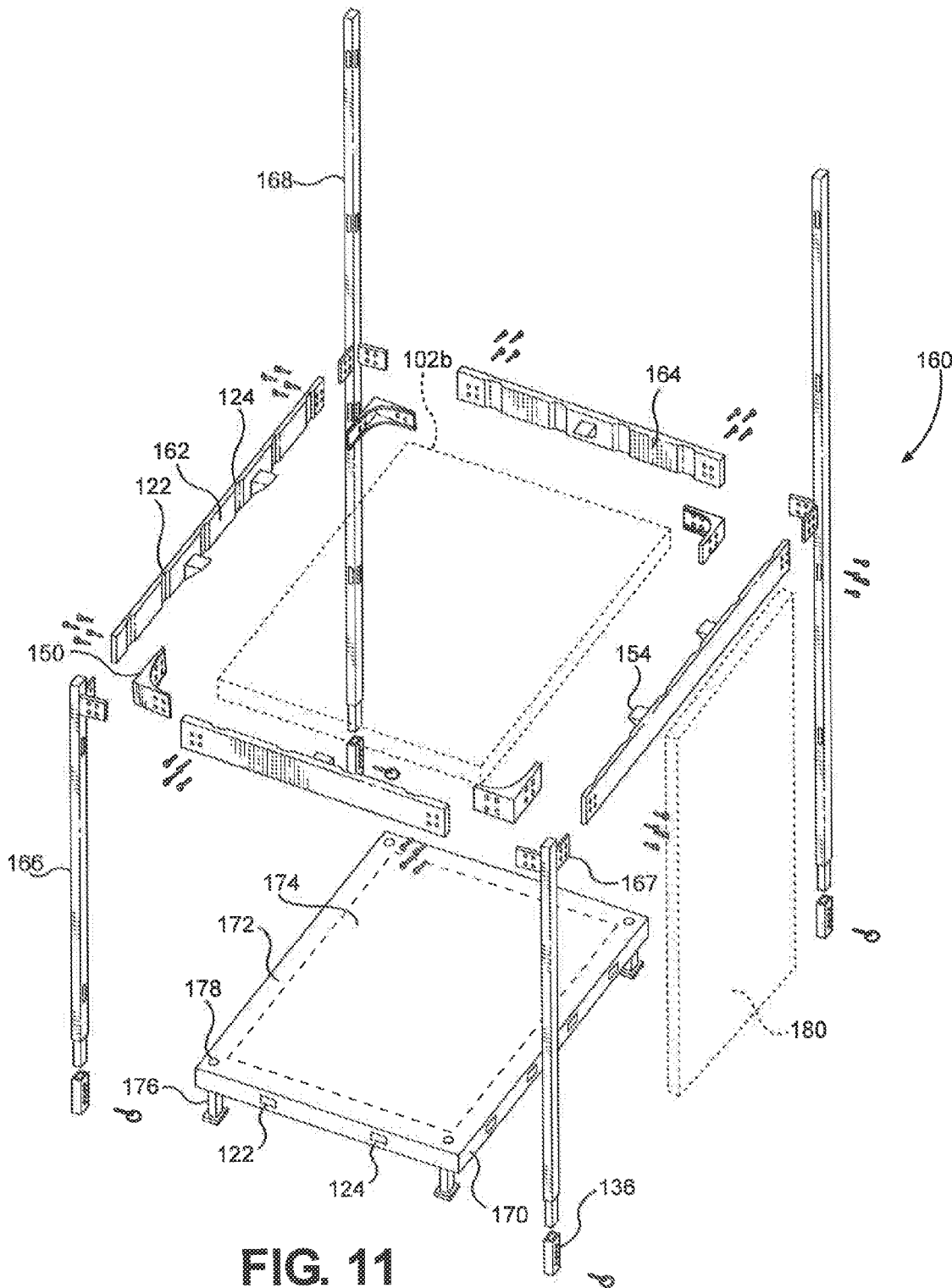
FIG. 11 is an exploded perspective view of an alternative embodiment of the present invention showing four of horizontal beams, six vertical corner posts having vertical support flanges and hardware for securing the horizontal beams, male and female connectors along the length of the vertical corner posts, and adjustable feet, creating a frame to which the interchangeable panels are secured and supported.

Referring finally to FIG. 11, an exploded perspective view of an alternative embodiment of an RHU frame of the present invention is shown and generally designated 160. RHU frame 160 is shown with two long horizontal beams 162 and two short horizontal beams 164, in addition to two one-story vertical corner posts 166 and two two-story vertical corner posts 168. Also pictured are the adjustable feet 136. A ceiling panel 102b and a wall panel 180 are shown in dashed lines where they would be placed in a completed RHU 120.

RHU frame 160 features a floor panel 170 having a frame 172 and a floor board 174. Similar to the previous embodiments, floor panel 170 has M locks 122 and F locks 124 disposed about the periphery of the frame 172 for connection to wall panels 102a. Frame 172 is a metal frame providing additional structural support to the entire RHU frame 160, further being formed with adjustable feet 176.

This Figure further indicates the various options available with the interchangeable components of the present invention. Horizontal beams 162 and 164 are not required to be of identical lengths, as shown, but may be formed of a suitable length required for a given design. Further, the vertical corner posts 166 can be manufactured in lengths that accommodate taller, two story structures. The embodiment described by this Figure also depicts vertical corner posts 166 and 168 formed with only one set of flanges 167. In this embodiment, construction of an RHU 100 requires the use of at least one floor panel 170. Alternatively, this RHU frame 160 may also be incorporated as a second story of a given RHU 100, since the ceiling of the lower story will become a floor for the second story.

During construction of an RHU 10, 100, 120, or 160, the floor is commonly the first portion of the assembly completed. Beginning initially with flat area, a single floor panel 170, as shown, the adjustable feet 176 can be utilized to ensure a level floor as a starting point. In a preferred embodiment, flat terrain with less than a four percent grade is optimum. Adjustable feet 176 are mounted on posts (not shown) threaded within each corner of frame 172 at adjustment points 178, as is known in the art. As such, the same tool 50 can be used to rotate adjustable feet 176 and extend or retract adjustable feet 176 at adjustment point 178.

Once the floor panel 170 is level, additional floor panels 170 can be laid down adjacent thereto in order to increase the footprint. Each is then secured using the M locks 122 and F locks 124 disposed about their periphery as described throughout. Wall panels 180 can then be attached to floor panel 170. Wall panels 180 are the same size and composition as wall panels 102a, with the option of having an interior ledge (not shown) analogous to ledge 40 from FIG. 4 providing support for the wall panel 180 during construction. Additionally, in an embodiment, wall pane 180 is formed with additional M locks 122 and F locks 124 horizontally disposed along the interior base of wall panel 180 in order to interface with those complementary M locks 122 and F locks 124 of floor panel 170.

In an embodiment, once the floor panels 170 and at least a wall panel 180 at a corner is in place, vertical corner posts 166 or 168 can then be attached as indicated. The adjustable feet 136 of a corner post 166 or 168 is adjusted to interface the M locks 122 and F locks 124 disposed along the length of corner post 166 or 168 with those of wall panel 180. Once a plurality of corner posts 166 or 168 are erected and secured to the respective wall panels 180, horizontal beams 162 or 164 are secured to flanges 167 allowing further construction of the ceiling and upper floors as described herein. It should be appreciated that in such an embodiment, the floor panel 170 is not directly connected to the vertical corner posts 166 or 168. Whereas a single ceiling panel 102b is shown in this Figure, the flexibility of the components allows expansion of the footprint to nearly any desirable floorplan.

While there have been shown what are presently considered to be preferred embodiments of the present invention, it will be apparent to those skilled in the art that various changes and modifications can be made herein without departing from the scope and spirit of the invention.

What is claimed is:

1. A construction set for assembling a relocatable habitat unit comprising:
    a plurality of interchangeable panels, each of said panels having a periphery defined by a left side edge, a right side edge, a top edge, and a bottom edge, each of said panels being available for use as a wall, a ceiling, or a floor, and each of said edges being formed with at least one male lock connector and at least one female lock connector;
    a plurality of horizontal beams having at least one tab positioned along the length of said horizontal beams configured to support the edges of said panels and at least two orthogonally disposed faces, each of said faces formed with at least one male lock connector and at least one female lock connector for engagement of at least one of said panels;
    at least one corner bracket having a first face configured to attach to a first horizontal beam, a second face perpendicular to the first face configured to attach to a second horizontal beam, and a flat top portion, wherein the at least one corner bracket is positioned such that the flat top portion forms a horizontal plane with at least one tab;
    a plurality of vertical corner posts having a central lumen a base sized to fit into said central lumen, and at least two orthogonally disposed faces, each of said faces formed with at least one male lock connector and at least on female lock connector for engagement of at least one of said panels; and
    a hand tool having a head, a drive for holding said head, and a handle connected to said drive for manipulating the combination of said drive and said head, said hand tool used for actuating lock connectors and hardware to fixedly join the panels together during assembly of the habitat unit.

2. The construction set of claim 1 wherein each male connector comprises:
    a socket mounted on a panel for receiving said hand tool therein; and
    a cam lock affixed to said socket for rotation therewith, wherein the cam lock includes a first ramp and an opposed second ramp, with the ramps inclined to form a decreasing taper with increased distance from the socket.

3. The construction set of claim 2 wherein said head is a hex head wrench and said socket is a hex socket.

4. The construction set of claim 1 wherein each female connector comprises:
    a first abutment formed on a panel; and
    a second abutment formed on the panel, with the second abutment being distanced from the first abutment for simultaneous engagement with a respective ramp on the male connector to hold the respective panels together.

5. The construction set of claim 1 wherein each panel is substantially rectangular shaped.

6. The construction set of claim 1 wherein each panel is made substantially of a composite polymer foam material.

7. The construction set of claim 1 wherein said panels can be selectively configured as door panels, window panels, wall panels, ceiling panels and floor panels.

8. The construction set of claim 7 wherein said panels are cut and "scenticed" to resemble actual building materials.

9. The construction set of claim 1 wherein said panels can be selectively removed and replaced without adjustment of other features.

10. The construction set of claim 1 wherein said panels are formed substantially of polystyrene foam.

11. The set as recited in claim 1, further comprising a floor panel wherein the floor panel consists of a frame and at least one interchangeable panel.

12. The set as recited in claim 11, wherein the floor panel further comprises adjustable feet.

13. The set as recited in claim 1, wherein the vertical corner posts are of varying lengths to support multi-story relocatable habitat units.

14. The set as recited in claim 1, wherein one or more interchangeable panels are replaced with a roll up door.

\* \* \* \* \*

UNITED STATES PATENT AND TRADEMARK OFFICE
CERTIFICATE OF CORRECTION

PATENT NO. : 9,016,002 B2  Page 1 of 1
APPLICATION NO. : 13/843707
DATED : April 28, 2015
INVENTOR(S) : Stuart Charles Segall It is certified that error appears in the above-identified patent and that said Letters Patent is hereby corrected as shown below:

In the Claims

Column 14, line 29, change "lumen" to --lumen,--; line 32, change "on" to --one--

Signed and Sealed this
Eighteenth Day of August, 2015

Michelle K. Lee
*Director of the United States Patent and Trademark Office*